W. H. CALLAN.
APPARATUS FOR UNLOADING COMPRESSORS.
APPLICATION FILED FEB. 19, 1916.

1,274,383.

Patented Aug. 6, 1918.
8 SHEETS—SHEET 3.

Fig. 3.

WITNESSES

INVENTOR
William H. Callan,
BY
ATTORNEYS

UNITED STATES PATENT OFFICE.

WILLIAM H. CALLAN, OF FRANKLIN, PENNSYLVANIA, ASSIGNOR TO CHICAGO PNEUMATIC TOOL COMPANY, OF CHICAGO, ILLINOIS, A CORPORATION OF NEW JERSEY.

APPARATUS FOR UNLOADING COMPRESSORS.

1,274,383.  Specification of Letters Patent.  Patented Aug. 6, 1918.

Application filed February 19, 1916. Serial No. 79,287.

*To all whom it may concern:*

Be it known that I, WILLIAM H. CALLAN, a citizen of the United States, residing at Franklin, in the county of Venango, State of Pennsylvania, have invented a new and useful Apparatus for Unloading Compressors, of which the following is a specification.

My present invention consists of a novel apparatus for unloading and loading compressors wherein a system of step regulation is employed to vary the load on the compressor.

It further consists of a novel unloading system in which in the initial steps the volume of the intake is reduced by the expansion of air from clearance chambers into the cylinders, and thereafter portions of the load are taken off by holding regular working inlet valves open at alternate ends of the cylinders.

It further consists of a novel manner of unloading compressors by first increasing the effective area or volume of the compression chamber and thereafter automatically reducing the load on the compressor in accordance with the increase of pressure in the receiver by progressively placing ports at the ends of the compression chamber in communication with the atmosphere.

It further consists of novel unloading mechanism which includes a novel construction and arrangement of clearance chambers, novel means for controlling them, and a novel arrangement of automatically controlled ports communicating with the compression chambers.

It further consists of a novel apparatus for unloading compressors wherein in the first two steps clearance chambers are automatically placed in communication with the cylinders. These clearance chambers have a capacity equal to about forty per cent. of the cylinders' volume so that after a piston has receded about forty per cent. of its stroke the chambers become exhausted and cool air is drawn in through the clearance chambers, such cool air passing first, in the form of mechanism illustrated, through auxiliary check valves.

Other novel features of construction and advantage will hereinafter more clearly appear in the detailed description of my invention.

For the purpose of illustrating my invention I have shown herein a preferred form which is a typical embodiment of my invention, but it is of course to be understood that the various instrumentalities of which my invention consists may be variously arranged and organized and that my invention is not limited to the precise arrangement and organization of these instrumentalities, or to the sequence of steps employed, as herein disclosed.

Similar numerals of reference indicate corresponding parts in the figures.

Referring to the drawings:—

1 designates a cylinder of an air compressor in conjunction with which an unloading mechanism embodying my invention is employed, said cylinder being provided with a piston or compression chamber 2 in which the piston 3 reciprocates. The piston 3 is provided with a piston rod 4 which is driven by means of any desired source of power. The piston chamber 2 is surrounded by a water jacket 5.

6 designates a main air inlet which communicates with the air inlet chamber 7 formed preferably in the casting of the cylinder 1.

8 and 9 designate valve mechanisms controlling communication between the air inlet chamber 7 and the chambers 10 and 11 respectively. The chamber 10 communicates with one end of the piston chamber 2 by means of the port 12, said port being controlled by an automatic valve mechanism 13. The chamber 11 is divided from the chamber 10 by a wall 14, and said chamber 11 communicates with the opposite end of the piston chamber 2 by means of a port 15 which is controlled by means of an automatic valve mechanism 16. The construction of the automatic valve mechanisms employed will be best understood by reference to Fig. 19.

Since the different automatic valve mechanisms are constructed in a similar manner, I have deemed it necessary in the present instance to describe in detail but one of them. It is of course, to be understood that any desired or conventional type of unloading mechanism may be employed, and in the present instance I have preferred to show an unloading mechanism corresponding to that described and generically claimed in my copending application, Serial No. 70,116, filed January 4th, 1916. For convenience of illustration, I have shown a type of valve which is now well known in the art under the name of "Simplate" valve.

Figures 18, 19, 20:
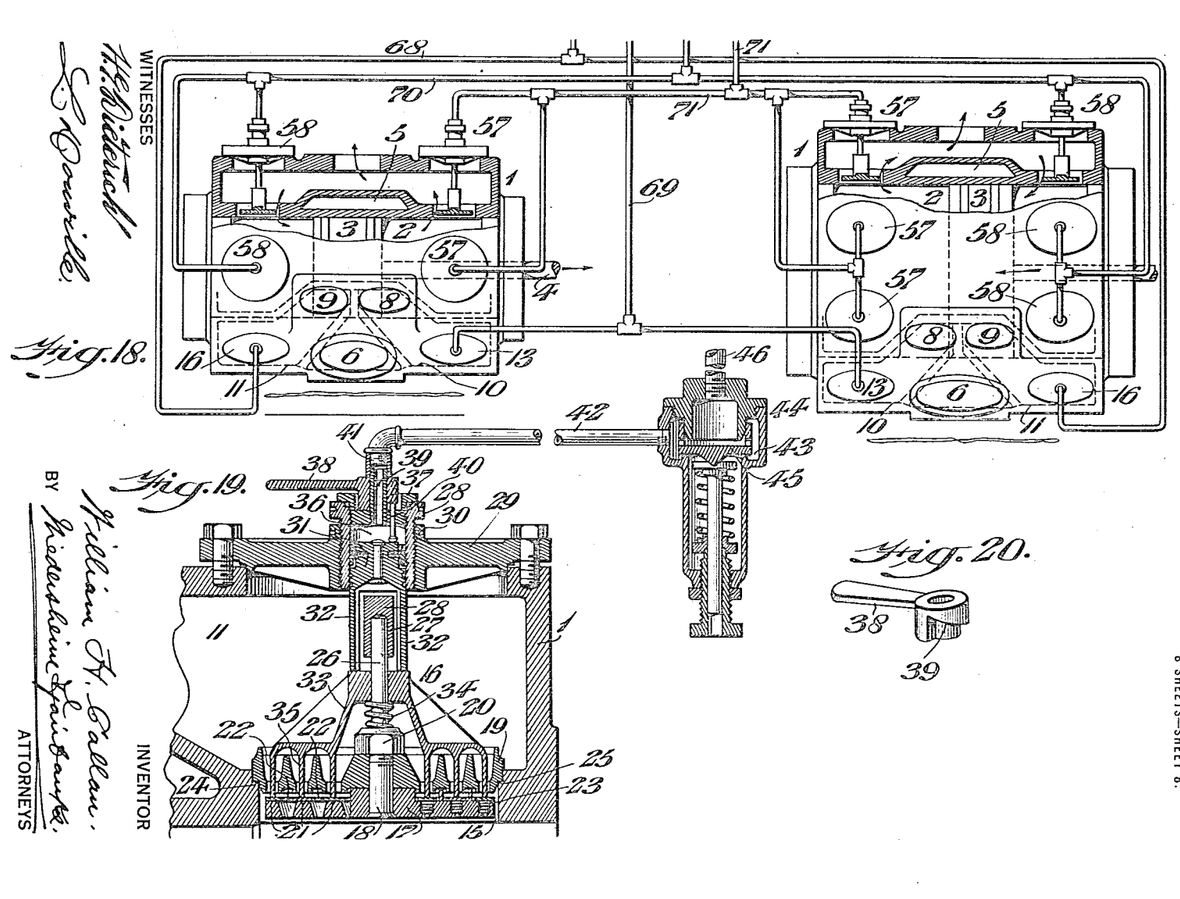
Fig. 18 represents diagrammatically the high and the low pressure cylinders as they appear during the fifth step when fully unloaded, the load peaks of the cylinders being also diagrammatically illustrated.
Fig. 19 represents a sectional elevation of a type of means employed to automatically or manually actuate an unloading valve.
Fig. 20 represents in perspective a cam lever seen in Fig. 19.

Referring more particularly to Fig. 19, each automatic valve mechanism comprises an apertured plate or valve keeper 17 through which extends a valve stud comprising a bolt 18 which also passes through an upper apertured plate or valve seat 19 which is spaced from the valve keeper 17.

The members 17 and 19 are secured in position by means of a nut 20 in threaded engagement with the bolt 18. The apertured valve seat and valve keeper are provided with hubs or bosses through which the bolt 18 passes, and thereby a space is formed to permit the movement of the valves 21, which latter consist of annular plates spaced from each other to form the ports 22, said ports being in alinement with the apertures in the valve keeper. The valve keeper 17 is provided with any suitable guiding means for the valves. The valve keeper carries the volute springs 23, which normally tend to maintain the valve plates in closed position against their seats. The valve seat 19 is provided with a peripheral seat 24 at its bottom which engages a shoulder 25 on the cylinder 1. The bolt 18 is provided with an upwardly extending post or stud 26 which is adapted to be received in the aperture 27 of the cylinder 28, which is exteriorly threaded in order that it may be screwed into the valve cover 29, which latter is secured to the cylinder in any desired manner. The cylinder is provided with a lock nut 30 in order to maintain it in its adjusted position.

The cylinder 28 performs a double function, since when it is screwed into the valve cover it engages the valve stud 26 and holds the valve cage on its seat and at the same time it provides a cylinder adapted to receive a piston 31. The forward end of the piston 31 is chambered to permit the same to surround the central forward end of the cylinder 28, and such forward extension is connected with the main body of the cylinder by means of an offset or brace member (not shown) preferably integral therewith, and which serves as a guide for the forward portions of the piston 31 which is longitudinally bisected at its forward end to form the flanges or blades 32. The flanges 32 of the piston abut against the valve lifter 33, which is guided on the valve stud 26 and is normally maintained in its raised position by means of a spring 34 interposed between the nut 20 and the hub of the valve lifter 33. The valve lifter 33 has a flange extending forwardly from its hub portion and is provided with forwardly projecting portions 35 which are adapted to pass through the ports in the valve seat in order to hold the valves in their open position. The upper end of the piston chamber 36 is made air tight by means of a close fitting threaded cap 37 in threaded engagement with the cylinder. The cap 37 has its upper face recessed to receive the hub of a manually actuated handle 38, and said hub is provided with a cam face 39, as best shown in Fig. 20. The hub of the handle 38 is apertured to provide for rotatably mounting it on the pipe 39 which latter is in threaded engagement with the cap in order to provide for the admission of motive fluid into the piston chamber 36. The cam face 39 on the handle 38 is adapted to bear against the upper end of a plunger 40 which is carried by the cap 37 and adapted to contact with the piston 31 to move it forwardly. The pipe 39 is connected by means of a coupling 41 with a pipe 42 which communicates with a chamber 43 formed in a differential unloader valve 44, which may be of any desired or conventional type.

The coupling illustrates one type of means which may be employed to retain the cam face 39 in its proper relation to the plunger or pin 40.

The valve 44 as shown, comprises a sectional casing in which is located a spring pressed valve 45 controlling communication with the pipe 46 leading to the receiver.

In the automatic operation of an individual unloading mechanism, a differential unloader valve 44 operates when the receiver pressure reaches the predetermined point. Motive fluid is admitted through the pipe 39 into the piston chamber 36, to advance its piston 31 and thereby the valve lifter 33. This causes the valves 21 to be opened and held open until the receiver pressure has been reduced to a point at which the differential unloader valve moves against its upper seat thus exhausting the fluid from pipes 39 and 42, and piston chamber 36. The spring 34 then forces the valve lifter and piston back into their normal or running position.

Figure 1:
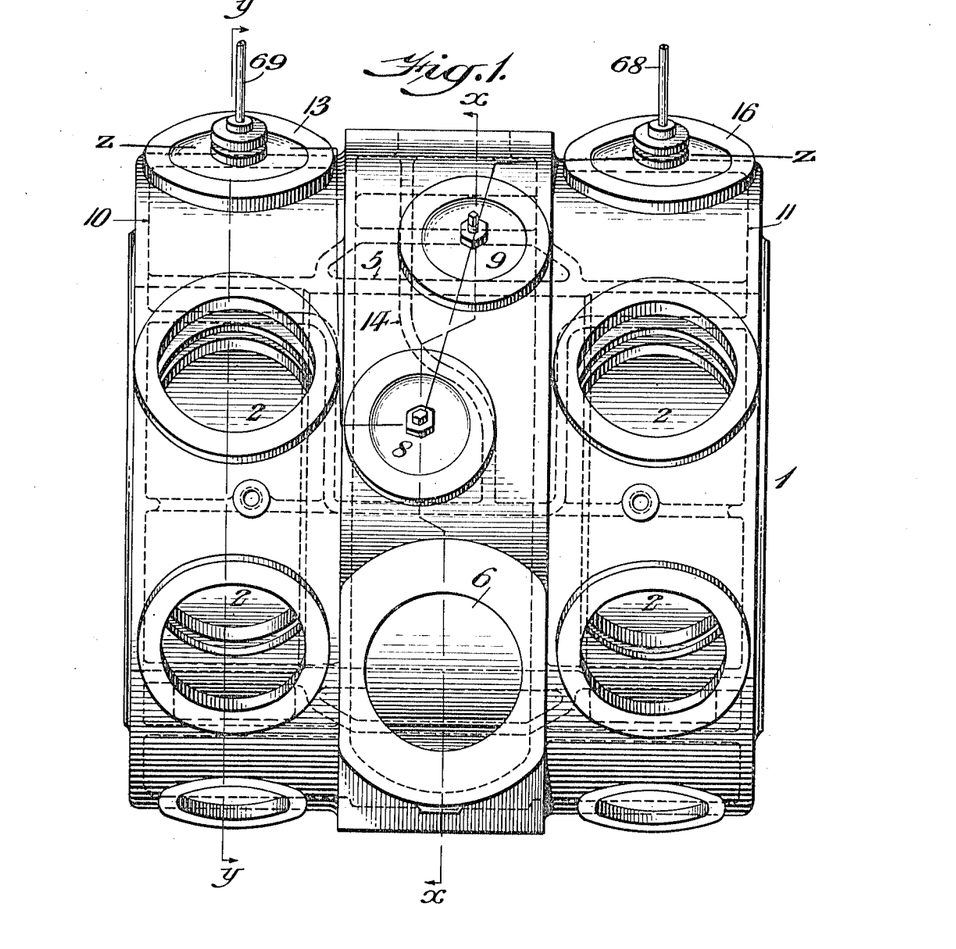
Figure 1 represents a side elevation of an air compressor in conjunction with which an unloading mechanism embodying my invention is employed.
Figure 2:
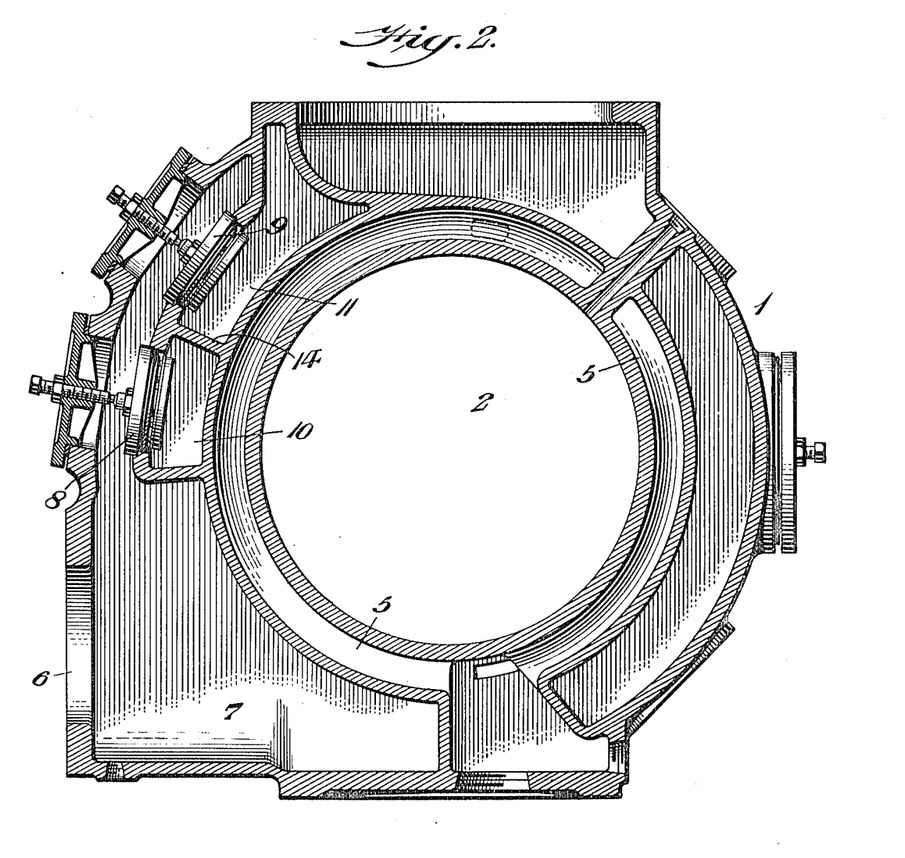
Fig. 2 represents a section on line $x$—$x$ of Fig. 1.
Figure 3:
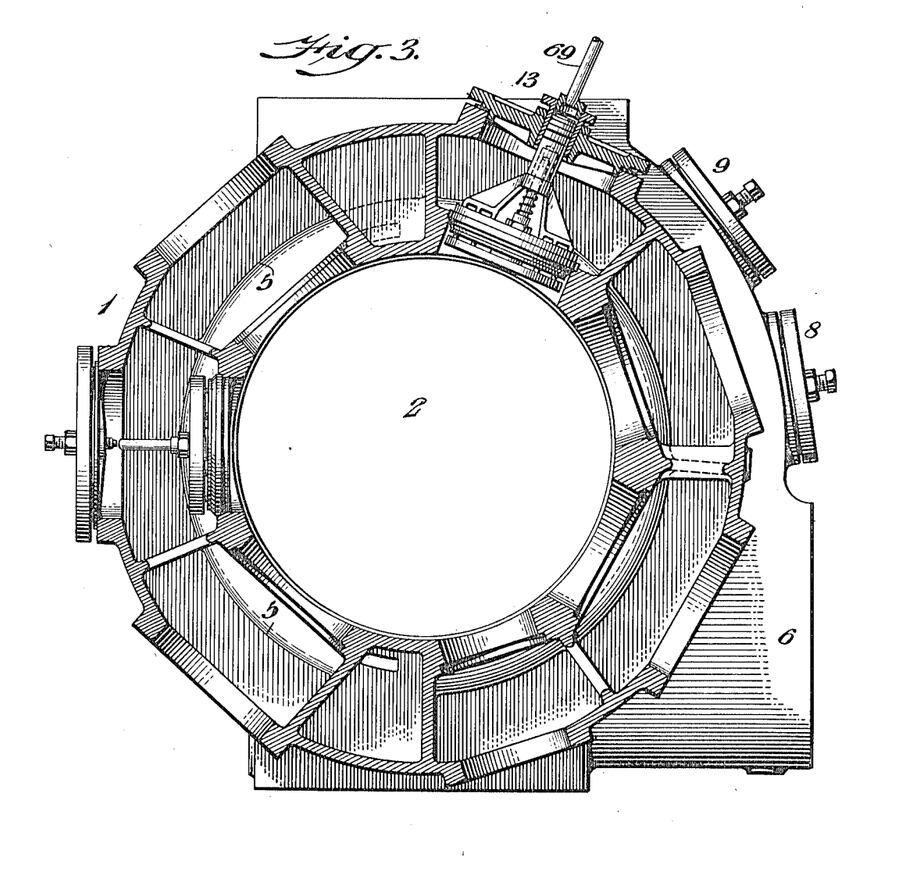
Fig. 3 represents a section on line $y$—$y$ of Fig. 1.
Figure 4:
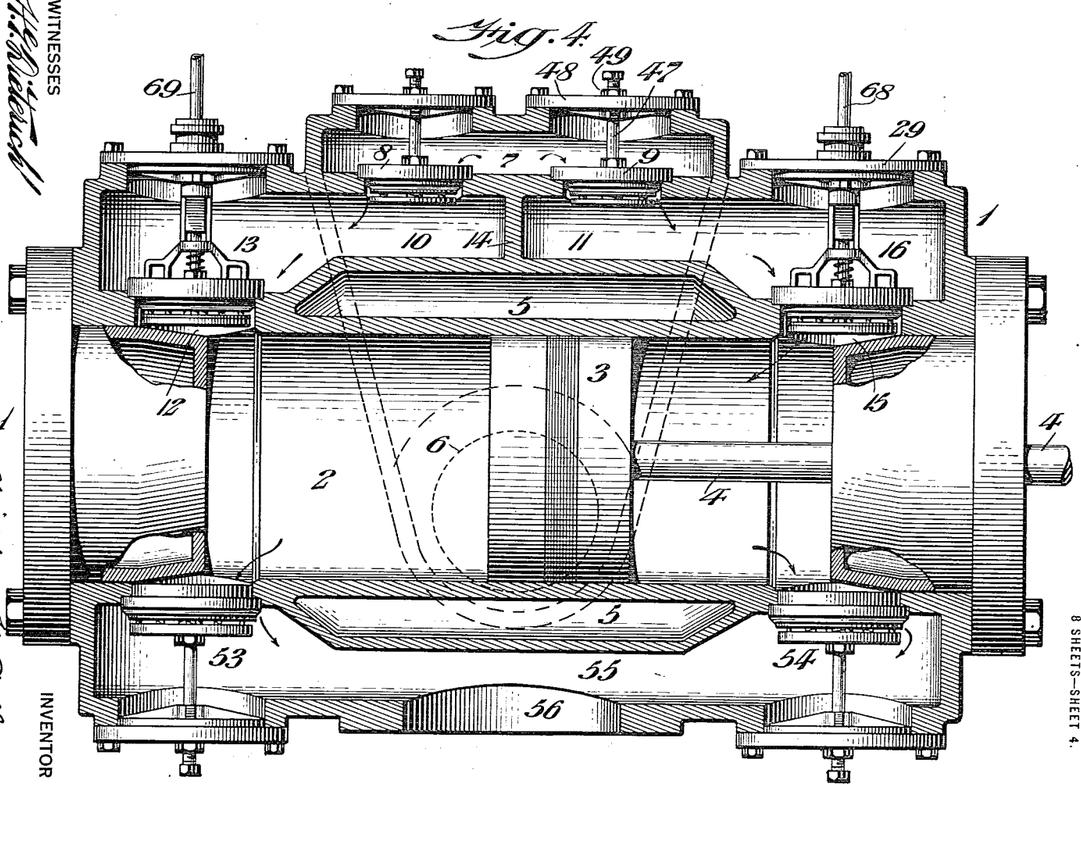
Fig. 4 represents a section on line $z$—$z$ of Fig. 1.
Figure 5:
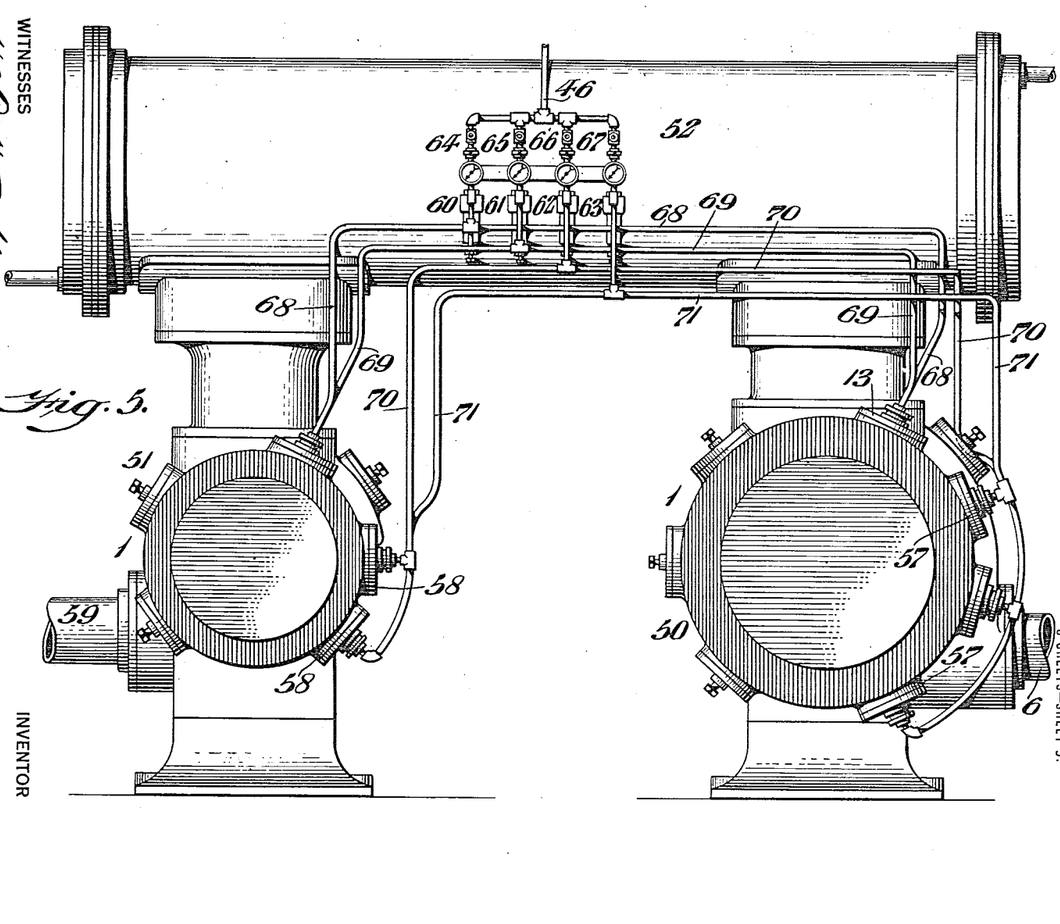
Fig. 5 represents an end elevation of the compressor and unloading mechanism.

Referring now to Fig. 4, it will be seen that the valve mechanisms such as 8 and 9 which are not automatically actuated are each secured in place by means of a bolt 47, engaging a cap 48 and provided with a lock nut 49, the forward end of a bolt 47 engaging the valve cage to secure it against its seat. 50 designates the low pressure cylinder, and 51 designates the high pressure cylinder, said cylinders being connected with the intercooler 52 in the usual manner, as will be understood by reference to Fig. 5.

53 and 54 designate discharge valve mechanisms, see Fig. 4, communicating with opposite ends of the piston or compression chamber 2, and with a chamber 55 which is in communication with the main discharge port 56.

In the low pressure cylinder, 57 designates a plurality of automatic unloading valves located at the head end of the cylinder, and 58 designates a plurality of automatic unloading valves located at the crank end of the cylinder. In the high pressure cylinder the position of the valves 57 and 58 is reversed. The high pressure cylinder is provided with valve mechanisms and ports and passages corresponding to those of the low pressure cylinder. I have therefore identified the same by the same reference characters, it being noted that the position of the corresponding valves relatively to the head end and crank end is reversed on the high pressure cylinder.

The high pressure cylinder 51 is provided with a discharge conduit 59, see Fig. 5, which leads to the receiver. Referring now more particularly to Figs. 6, 9, 12, 15 and 18, I have illustrated diagrammatically in these figures, the position the various parts assume during the cycle of the operation.

Referring first to Figs. 9, 60, 61, 62 and 63 designate automatic unloading valves corresponding in construction to the valve 44 seen in Fig. 19. The valve mechanisms communicate by means of valve controlled conduits 64, 65, 66 and 67, respectively, with the conduit 46 leading to the receiver. Each of these conduits 46 is preferably provided with a pressure gage as shown. The valve mechanisms 16 of the high and low pressure cylinders are connected by a conduit 68 with the automatic valve mechanism 60 or first unloader.

Figures 12, 13, 14, 15, 16, 17:
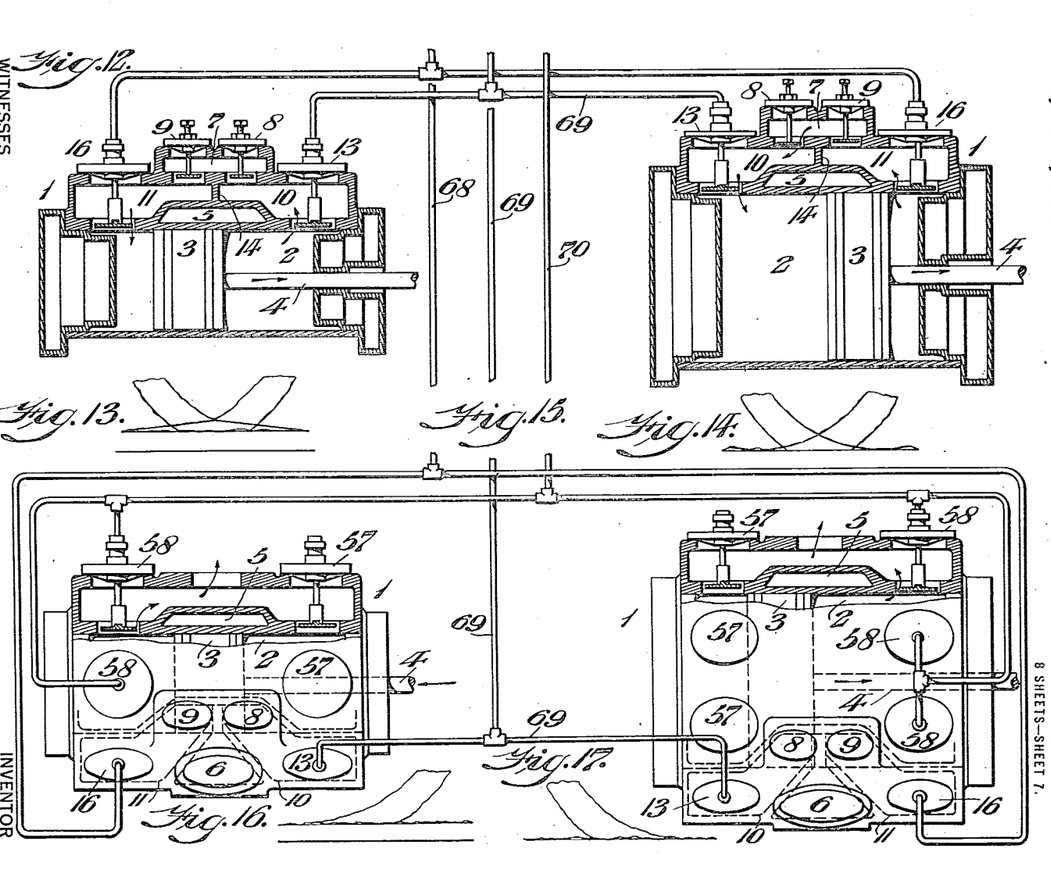
Fig. 12 represents diagrammatically the high pressure and the low pressure cylinders as they appear in the third step of the operation when under half load.
Fig. 13 represents diagrammatically the load peak of the high pressure cylinder seen in Fig. 12.
Fig. 14 represents diagrammatically the load peak of the low pressure cylinder seen in Fig. 12.
Fig. 15 represents diagrammatically the high pressure and low pressure cylinders as they appear during the fourth step when under one quarter load.
Fig. 16 represents diagrammatically the load peak of the high pressure cylinder, seen in Fig. 15.
Fig. 17 represents diagrammatically the load peak of the low pressure cylinder, seen in Fig. 15.

In Fig. 12, the valve mechanisms 13 are connected by a conduit 69 with the valve mechanism 61 or the second unloader. In Fig. 15, the automatic valve mechanisms 58 are connected by the conduit 70 to the valve mechanism 62, or the third unloader.

In Fig. 18, the automatic valve mechanisms 57 are connected by the conduit 71 with the valve mechanism 63, or the fourth unloader. It will now be understood that each set of automatically operated unloading valves is connected with a valve which is controlled by the receiver pressure. In the unloading operation, I employ a clearance and by-passing method of taking off and putting on the load in successive steps. In the first two steps, the load is varied by placing the clearance chambers in communication with the cylinders, thus reducing the volume of the intake by the expansion of the air from the clearance chambers to the cylinders. In the next two steps, the load is taken off by holding the inlet valves open at alternate ends of the cylinders and oscillating the air as the pistons reciprocate.

In accordance with the present invention, the clearance chambers in the first two steps are automatically placed in communication with the cylinders, but since these clearance chambers only have a capacity equal to about forty per cent. of the cylinders' volume, it follows that after the piston has receded forty per cent. of its stroke, the chambers become exhausted and the auxiliary check valves 8 and 9 open and cool air is drawn in through the clearance chambers 10 and 11. This occurs on each and every stroke of the piston during the first two steps.

In the next two steps, all of the inlet valves are held open and air is oscillating in and out of the cylinders at each reciprocation of the piston.

Figures 6, 8, 9, 11:
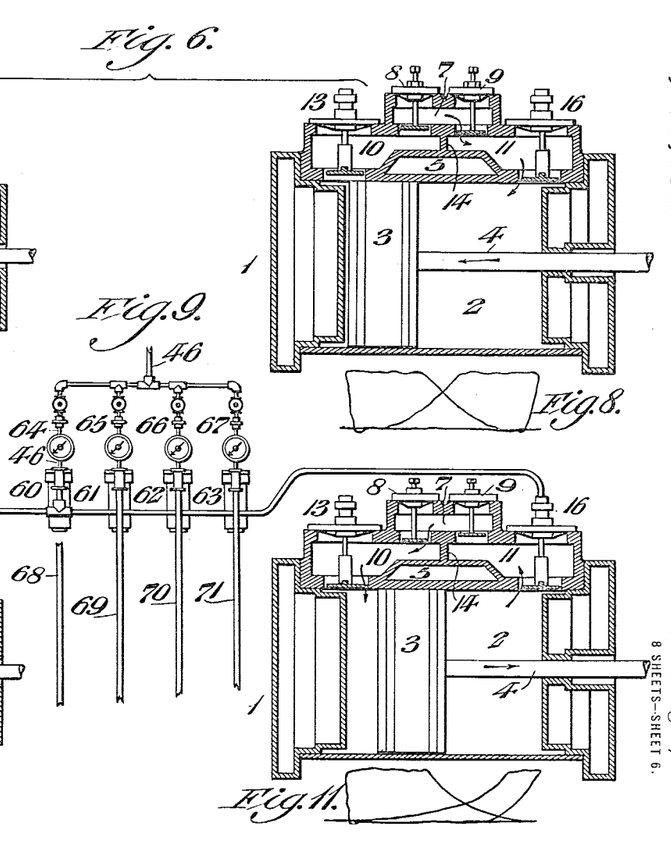
Fig. 6 represents diagrammatically the high pressure and the low pressure cylinder in the first step of the operation and under full load.
Fig. 8 represents diagrammatically the load peak of the low pressure cylinder seen in Fig. 6.
Fig. 9 represents diagrammatically the high pressure and low cylinder with connections to the automatic unloading valves, the parts being shown as they appear during the second step of the operation when the compressor is under three quarter's load.
Fig. 11 represents diagrammatically the load peak of the low pressure cylinder seen in Fig. 9.
Figure 7:
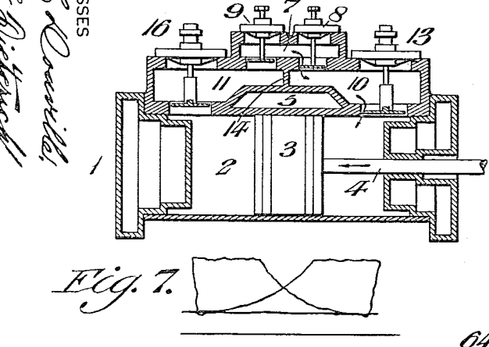
Fig. 7 represents diagrammatically the load peak of the high pressure cylinder seen in Fig. 6.

In Fig. 6, I have illustrated diagrammatically the position the parts assume during the first step of the operation, at which time the compressor is operating under full load. The section is taken through the center of the auxiliary valves 8 and 9 and the inlet valves 13 and 16. These valves 13 and 16 are located within the clearance chambers and under normal compression, the air is admitted to the main inlet 6 and inlet chamber 7 and passes through the auxiliary valves 8 and 9 into the clearance chambers 10 and 11 and then through the valves 13 and 16 into the cylinders.

Figure 10:
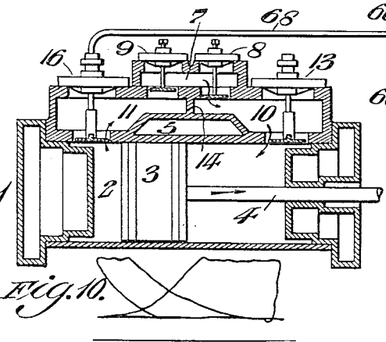
Fig. 10 represents diagrammatically the load peak of the high pressure cylinder seen in Fig. 9.

In Fig. 9, the parts are shown in the relation they appear when operating under three quarters load, and the first unloading valve 60 has operated, thereby opening the inlet valve 16 at the crank end of the low pressure cylinder and the head end of the high pressure cylinder thereby placing the clearance chambers 11 in communication with the cylinders. As the piston moves away from the end of the cylinder on which the inlet valves are held open, the air flows from the clearance chamber 11 into the cylinder, thus reducing the volume of the intake as illustrated diagrammatically in Figs. 10 and 11.

In Fig. 12, the next step is shown in the unloading operation, the parts being shown in the position they appear when the compressor is working under substantially one-half load. At this time, the second unloader 61 has operated, holding the inlet valves 13 open on the opposite ends of the high and low pressure cylinders, thus placing the clearance chambers 10 in communication with the cylinders and thereby reducing the volume of the intake, as diagrammatically illustrated in Figs. 13 and 14.

In Fig. 15, the parts are shown in the position they appear when the compressor is operating under one-quarter load. At this point, the receiver pressure has increased sufficiently to actuate the third loader 62, holding the inlet valves 58 open at alternate ends of the cylinders, thus allowing all the air taken in on these ends of the cylinders to be forced out through the inlet valves as the piston travels toward the crank end of the low pressure cylinder and toward the head end of the high pressure cylinder, thus reducing the volume of the intake, as represented diagrammatically in Figs. 16 and 17.

In Fig. 18 I have shown the relation of the parts to each other when the compressor is fully unloaded, and at this point, the receiver pressure has risen sufficiently to operate the fourth unloader 63, so that the inlet valves 57 are held open at the crank end of the high pressure cylinder and at the head end of the low pressure cylinder, thus allowing all the air taken in to be forced out as the piston approaches on its compression stroke. This condition is indicated diagrammatically by the indicating cards located beneath Fig. 18 and forming a part thereof.

During all full load operation, the auxiliary valves 8 and 9 and the inlet valves 13 and 16, which are within the clearance chambers 10 and 11 respectively, admit air to the cylinders, the same as the rest of the regular inlet valves. For this reason all of the valves employed are working valves and none of them are separate or independent. The clearance chambers are only used during forty per cent. of the stroke, after which air is admitted to the cylinders through the auxiliary valves 8 and 9, and the clearance chambers 10 and 11.

It will thus be seen that in the complete cycle of the operation, the air admitted to the chamber 7 flows through the intermediate auxiliary valves 8 and 9 to the clearance chambers 10 and 11, and through the inlet valves 13 and 16 into the cylinder during all full load compression. When the receiver pressure has reached the unloading point, air is automatically admitted against the unloader valves 16, forcing them in and opening their inlet valves and holding them open, so that a portion of the air being compressed on each stroke enters the chambers 11. This air consequently reëxpands on the return stroke, thus preventing any of the inlet valves from opening for a definite period and correspondingly diminishing the volume of the intake.

In the next step of the unloading, the inlet valves 13 are automatically held open, allowing the clearance chambers 10 to communicate with the opposite ends of the cylinders, thus reducing the volume of the intake. In the next step, the inlet valves 16, as well as all other inlet valves on that end of the cylinder are held open, thus allowing cool air to flow in and out of the cylinder at each stroke.

In the next step, the inlet valves 13, as well as all the other inlet valves on that end of the cylinder, are automatically held open, completely unloading the compressor and allowing cool air to pass in and out at each end of the cylinders at each reciprocation of the pistons.

The clearance chambers are cast integral with the regular compression cylinders and are arranged with regular working inlet valves, certain of which may be opened or closed so that any desired portion of the load may be either automatically or manually taken off or thrown on.

It will be apparent from the foregoing that in carrying out my novel invention of unloading compressors, the load on the compressor is automatically reduced in accordance with the increase of pressure in the receiver.

In the first step of unloading, a portion of the air flows from a clearance chamber at one end of the cylinder during a portion of the stroke and during the rest of the stroke, cool air is admitted through this chamber.

In the next step, the same action takes place at each end of the cylinder chamber. Thereafter, I automatically and progressively reduce the load on the compressor by opening ports communicating with the ends of the compression chamber until the compressor is entirely unloaded.

In accordance with my present invention, I eliminate the necessity of employing valves independent of the pumping mechanism to control the unloading operation and I do not employ any inert or idle valves during the regular pumping period under full load conditions. I also eliminate the necessity of employing separate auxiliary receivers which are liable to become filled with oil and refuse. I also eliminate the necessity of employing valves independent of the pumping mechanism that only act when they operate to unload and which, owing to their infrequent action, soon become inefficient and leaky, the result of which is that a loss occurs during all normal compression.

I further eliminate the necessity of providing a space under the cylinders to accommodate cumbersome clearance tanks. I also eliminate the necessity of employing means to unbalance the inlet valves when unloading and eliminate the necessity of employing combination inlet and discharge unloaders.

I further eliminate the requirement of a vacuum being drawn into the cylinder during any stage of the unloading. I further do not require valves placed intermediate the ends of the cylinders which have to be opened to effect any of the steps in the unloading, thus avoiding clearance spaces and cutting of the pistons and cylinders.

It is also not necessary to provide means for closing the intake valve after the piston has traveled a part of the intake stroke, and no means are necessary to place the discharged air in communication with the cylinder during any point of the stroke.

In accordance with my present invention, the air is not heated abnormally under light loads, since during such period, cool air is passed in and out of the cylinder at each stroke.

It will further be noted that the clearance chambers are cast integral with the regular compressing cylinder and it is provided with regular working inlet valves in order that the load may be varied in accordance with requirements met with in practice.

In accordance with my present invention the amount of compression space on opposite sides of the compressing element is automatically increased during the first two steps of the unloading and thereafter the sets of auxiliary unloading valves at the ends of the compression space are progressively opened to fully unload the compressor. In loading the compressor, the auxiliary valves automatically close as the receiver pressure decreases and the amount of compression space is automatically reduced to normal as the receiver pressure continues to decrease.

It will now be apparent that I have devised a novel and useful apparatus for unloading compressors which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a compressor, a cylinder formed with an air inlet, clearance chambers communicating with the air inlet, and a compression chamber having its end portions in valve controlled communication with said clearance chambers, in combination with inlet valves controlling communication between the air inlet and the clearance chambers.

2. In a compressor, a cylinder formed with an air inlet, clearance chambers communicating with the air inlet, and a compression chamber communicating on opposite sides of its compressing element with the independent clearance chambers, a receiver, inlet valves controlling communication between the air inlet and the clearance chamber, and valves controlled by the receiver pressure and automatically controlling communication between the clearance chambers and the compression chamber.

3. In a compressor, a cylinder formed with an air inlet, independent clearance chambers communicating with the air inlet, and a compression chamber communicating on opposite sides of its compressing element with the independent clearance chambers, a receiver, inlet valves controlling communication between the air inlet and the clearance chamber, valves controlled by the receiver pressure and automatically controlling communication between the clearance chambers and the compression chamber, and means to manually actuate said last named valves.

4. In a compressor, the combination of a compressor cylinder having a main air inlet, independent clearance chambers in valve controlled communication therewith, and a compression chamber, each end of which communicates with an independent clearance chamber, a valve between each clearance chamber and the compression chamber, auxiliary valves communicating with each end of the compression chamber and with the air inlet, and means to actuate said valves.

5. In a compressor, the combination of a compressor cylinder having a main air inlet, independent clearance chambers in valve controlled communication therewith, and a compression chamber, each end of which communicates with an independent clearance chamber, a valve between each clearance chamber and the compression chamber, auxiliary valves communicating with each end of the compression chamber and with the air inlet, and means to manually actuate said valves.

6. In a compressor, the combination of a compressor cylinder having a main air inlet, independent clearance chambers in valve controlled communication therewith, and a compression chamber, each end of which communicates with an independent clearance chamber, a valve between each clearance chamber and the compression chamber, auxiliary valves communicating with each end of the compression chamber and with the air inlet, and means to automatically actuate said valves.

7. In a compressor, the combination of a receiver, a compressor cylinder discharging into said receiver and having a main air inlet, independent clearance chambers in valve controlled communication with said air inlet, and a compression chamber, each end of which communicates with an independent clearance chamber, a valve between each clearance chamber and the compression chamber, auxiliary valves communicating with each end of the compression chamber and with the air inlet, and means automatically controlled by variations of pressures in said receiver to actuate said valves.

8. In a compressor, the combination of a receiver, a compression cylinder having a main air inlet, clearance chambers in valve-controlled communication with the air inlet, and a compression chamber communicating at each end with independent clearance chambers, valves controlling communication between the clearance and compression chambers, auxiliary inlet valves at each end of the compression chamber, and means for successively loading the valves as the receiver pressure reaches predetermined points.

9. In a compressor, the combination of a receiver, a compression cylinder having a main air inlet, clearance chambers in valve-controlled communication with the air inlet, a compression chamber communicating at each end with independent clearance chambers, valves controlling communication between the clearance and compression chambers, auxiliary inlet valves at each end of the compression chamber, means for successively unloading the valves as the receiver pressure reaches predetermined points, and means for successively loading the valves as the receiver pressure falls to predetermined points.

10. In a fluid compressor, the combination with a cylinder having a compression chamber, a clearance chamber at each end communicating with the compression chamber, and an air inlet in valve-controlled communication with the clearance chambers, of valves controlling communication between the clearance chambers and compression chamber, auxiliary inlet valves at the ends of the compression chamber, all of said valves operating as regular working inlet valves, and means to progressively open said valves as the load on the compressor reaches predetermined points and to close said valves as the load decreases.

11. In a compressor, the combination of a cylinder having a compression chamber, clearance chambers communicating with the ends thereof, an air inlet in valve-controlled communication with said clearance chambers, valves controlling communication between the clearance chambers and the ends of the compression chamber, auxiliary inlet valves at the ends of the compression chamber, a receiver communicating with said compression chamber, automatic means for placing the clearance chamber at one end in communication with the compression chamber when the pressure in the receiver reaches a predetermined point, automatic means for placing the clearance chamber at the other end into communication with the compression chamber when the pressure in said receiver reaches a predetermined higher point, and automatic means for successively holding open said auxiliary valves when the pressure in said receiver continues to increase.

WILLIAM H. CALLAN.

Witnesses:
MARY B. ECKERT,
CHAS. H. HAESELER.